No. 884,113.
PATENTED APR. 7, 1908.
H. W. VIA.
PLOW.
APPLICATION FILED AUG. 13, 1907.
2 SHEETS—SHEET 1.
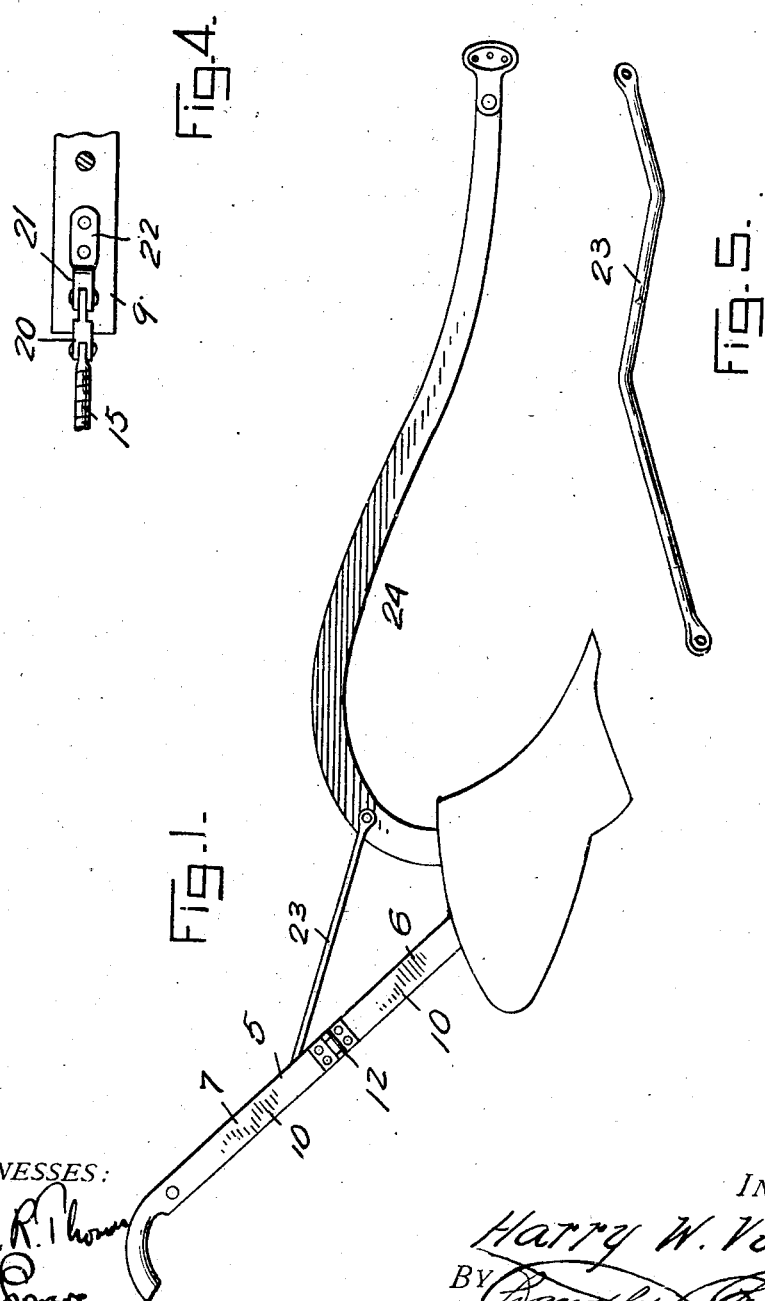
WITNESSES:
INVENTOR
Harry W. Via
BY
Attorneys No. 884,113.
PATENTED APR. 7, 1908.
H. W. VIA.
PLOW.
APPLICATION FILED AUG. 13, 1907.
2 SHEETS—SHEET 2.
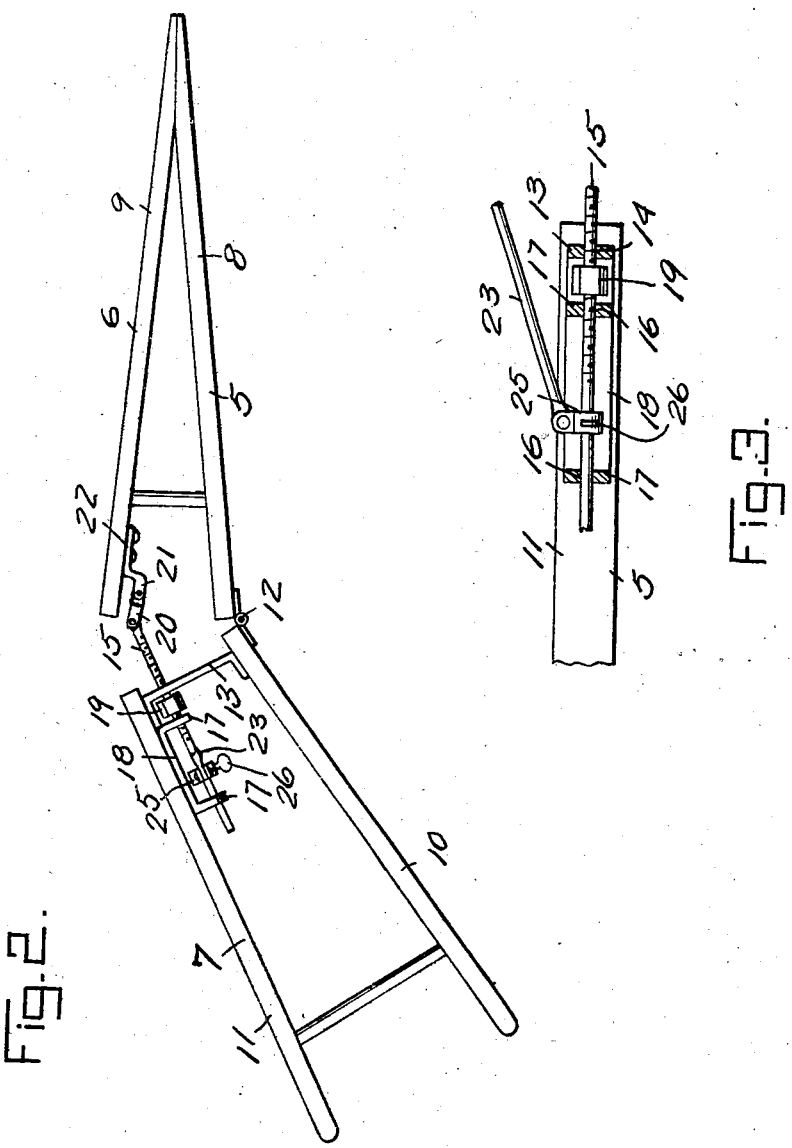
WITNESSES:
G. R. Thomas
John S. Powers
INVENTOR
Harry W. Via
BY Chandler & Chandler
Attorneys

UNITED STATES PATENT OFFICE.

HARRY W. VIA, OF SOUTH BOSTON, VIRGINIA.

PLOW.

No. 884,113.  Specification of Letters Patent.  Patented April 7, 1908.

Application filed August 13, 1907. Serial No. 388,399.

*To all whom it may concern:*

Be it known that I, HARRY W. VIA, a citizen of the United States, residing at South Boston, in the county of Halifax, State of Virginia, have invented certain new and useful Improvements in Plows; and I do hereby declare the following to be a full, clear, and exact description of the invention, such as will enable others skilled in the art to which it appertains to make and use the same.

This invention relates to new and useful improvements in plows and it has more particular reference to a turning plow for breaking the ground and for working plants that grow in beds, such as tobacco and for other plants that are worked with a hoe.

In connection with a plow of the above type, the invention aims as a primary object to provide a handle of novel construction and including hingedly connected sections, and means for moving one of said sections with relation to the other, so as to vary the angular disposition of the working face of the plow blade.

The details of construction will appear in the course of the following description in which reference is had to the accompanying drawings, forming a part of this specification like characters of reference designating similar parts throughout the several views, wherein:

Figure 1 is a side elevation showing the application of the present invention to a plow of conventional form. Fig. 2 is a top plan view showing the details of the handle above outlined. Fig. 3 is a section taken longitudinally through the adjusting means. Fig. 4 is a detailed view showing inside elevation a connection between a threaded rod and a bar of the handle to be hereinafter specifically referred to. Fig. 5 is a detailed perspective view of a brace included in the invention.

In the accompanying drawings, the numeral 5 designates generally a handle and the latter is formed of a front section 6 and a rear section 7, the front section 6 including side bars 8 and 9 and the section 7 including side bars 10 and 11. The side bars 8 and 10 are hinged together for movement in the plane of said handles as at 12. The bars 10 and 11 at their front ends support a transverse strap 13 having at one side thereof, an opening 14 through which a threaded adjusting rod 15 is loosely passed. The latter likewise passes through openings 16 in the arms 17 of a keeper 18 secured to the side bar 11. Between the strap 13 and the adjacent arm 17, an adjusting nut 19 is interposed, the latter being engaged with the threads of the bar 15. The said bar at its front end is pivoted to a link 20 and the latter is in turn pivoted to the offset portion 21 of a bracket 22 secured to the bar 9.

It will be apparent that by rotating the nut 19, the bar 15 will be moved longitudinally with relation to its keeper 18 and in such movement will move the section 6 correspondingly on the hinge joint 12 so as to vary the angular disposition of the working faces of the plow blade.

In connection with the means for varying the angular disposition of the handle members, means are provided for bracing the handle, with relation to the plow beam. With this object in view an angular brace rod 23 is employed which at its ends has connection with the plow beam 24 and with a split collar 25 mounted upon the smooth rear portion of the rod 15, the collar 25 being held against movement in the adjusted positions of the handles by a set nut 26.

From the foregoing description, it will be seen that simple and efficient means are provided for accomplishing the objects of the invention, but, while the elements ¦herein shown and described are well adapted to serve the functions set forth it is obvious that various minor changes may be made in the proportions, shape and arrangement of the several parts without departing from the spirit and scope of the invention as defined in the appended claims.

What is claimed is:

1. The combination with a plow beam, of a handle connected therewith and comprising a laterally movable rear end portion, and means for holding said laterally movable portion at ¦different points of its movement.

2. In combination with a plow beam, a handle therefor, the upper portion of the handle being laterally movable with relation to the lower portion, and means for effecting such movement.

3. In combination with a plow beam, a handle therefor, the upper portion of the handle being laterally movable with relation to the lower portion, means for effecting such movement, and a brace engaging said means and the beam.

In testimony whereof, I affix my signature, in presence of two witnesses.

HARRY W. VIA.

Witnesses:
 W. D. BLAIR,
 C. T. LOVELACE.